UNITED STATES PATENT OFFICE.

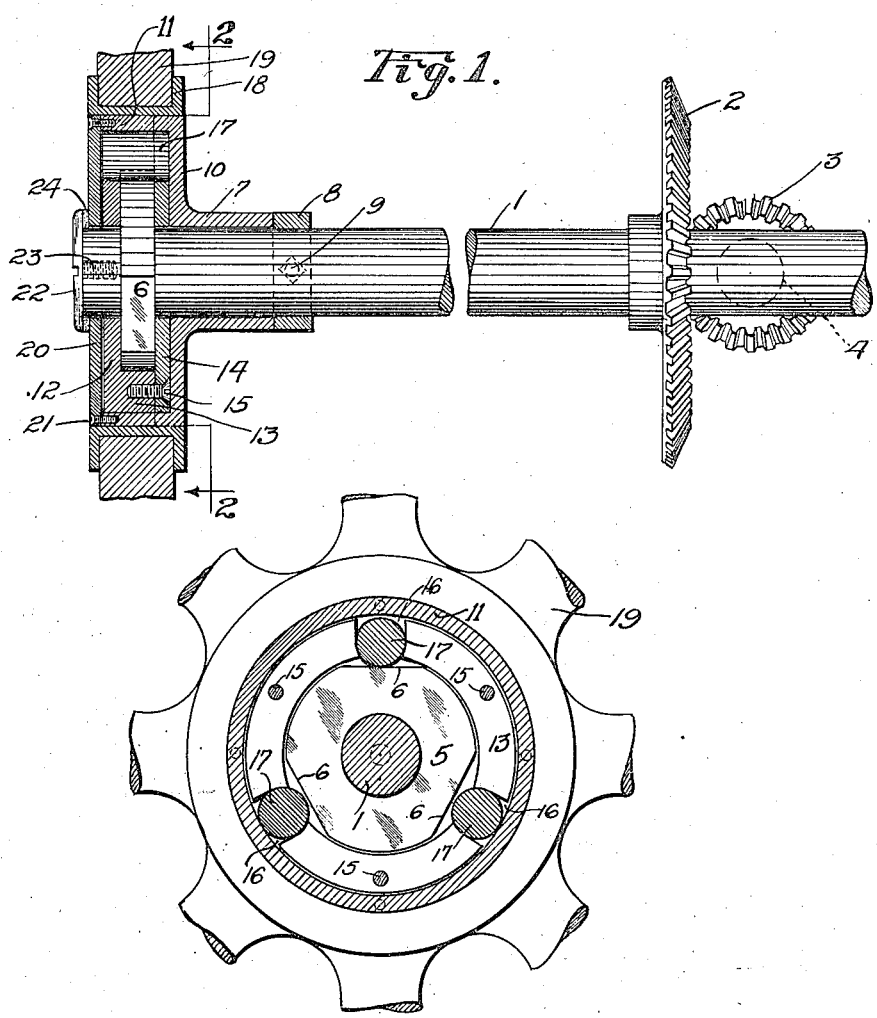

HORATIO G. COYKENDALL, OF SAN JOSE, CALIFORNIA.

DRIVE MECHANISM.

1,141,319.  Specification of Letters Patent.  Patented June 1, 1915.

Application filed February 9, 1914. Serial No. 817,481.

*To all whom it may concern:*

Be it known that I, HORATIO G. COYKENDALL, a citizen of the United States, residing at San Jose, in the county of Santa Clara and State of California, have invented certain new and useful Improvements in Drive Mechanism, of which the following is a specification.

The present invention relates to improvements in driving mechanism for wheels, pulleys or the like, and has for its principal objects to provide a structure which is capable of driving in either a forward or reverse direction, but which will permit the pulley, wheel or driven members to over-run the driving member when the speed thereof becomes greater than that of the driving member; to provide a structure which will permit both wheels of a pair to be driven, and will allow the outer wheel to over-run when the vehicle is rounding a corner; to provide a structure which is capable of performing the same function as the differential gear now in use, but which is free from the gears and complicated mechanism so common in the present differential gearings; one which is extremely simple in construction, may be manufactured at little cost and is thoroughly efficient for the purpose designed.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein—

Figure 1 is a sectional view of a wheel with my invention used in connection therewith, disclosing the drive shaft, the cam carried thereby, the hub, and the rollers interposed between the cam and the interior of the hub. Fig. 2 is a sectional view taken on line 2—2 of Fig. 1, disclosing the shape of the cam, the hub, and the rollers interposed between the flat faces of the cam and the hub.

Referring more particularly to the drawings, wherein like characters of reference designate corresponding parts throughout the several views, the numeral 1 designates a suitable drive shaft carrying a beveled gear 2 which intermeshes with a corresponding gear 3 carried by a power shaft 4 which furnishes power to rotate the shaft 1 in either direction. The shaft 1 carries adjacent its outer end a cam disk 5 which is either integral therewith or keyed thereto, and said disk is formed on its peripheral edge with a plurality of flat faces 6.

A suitable hub member 7 is rotatably mounted on the shaft 1 and is retained from longitudinal movement thereon in one direction by a collar 8 secured to the shaft by a screw 9. The hub member is provided with an annular wall 10 which terminates in an annular flange 11 and the said flange overhangs the disk 5 in spaced relation thereto.

A roller retainer in the form of a plate 12 is loosely mounted on the shaft 1 adjacent one face of the cam disk 5 and said plate carries an overhanging annular flange 13, the outer peripheral surface of which is in slight spaced relation to the inner surface of the hub flange 11, and the inner peripheral surface of said flange is in slight spaced relation to the peripheral edge of said cam disk. A suitable plate 14 detachably secured to the flange 13 by the screws 15 prevents the roller retainer from being displaced from over the cam disk. Suitable roller recesses 16 are provided in the peripheral edge of the roller retainer adjacent each flat face 6 and extend transversely thereof through the same, and in each of said recesses is positioned a cylindrical roller 17 of a diameter slightly smaller than the recesses and which rest on the flat faces 6 of the cam disk 5.

An annular spoke retaining member 18 is secured to the outer peripheral edge of the flange 11 of the hub and from the same radiates the spokes 19. A cover plate 20 is slipped over the end of the shaft and is secured to the outer face of the flange 11 by the screws 21 and a suitable shaft protecting cap 22 carrying a stem 23 which is threaded into an opening in the end of the shaft, covers the end of the shaft and is spaced from the plate 20 by the packing 24.

Power being applied to rotate the shaft 1 in either direction causes the cam 5 to also rotate, and the rotation of the same will cause the flat faces 6 thereof to assume a slightly inclined position beneath the rollers and force the same outwardly in their seats in contact with the inner surface of the flange 11, the rollers rolling backwardly on the flat surfaces 6 and lock the hub to rotate with the shaft and in the direction of rotation thereof. Should the hub attain a greater speed than the shaft, the friction between the interior of the flange and the rollers will cause the rollers to move forward from their wedged position on the flat surface of the cam until the rollers assume a neutral position, which will permit the hub to be free to rotate on the shaft.

It will be apparent that the drive shaft is capable of being rotated in either direction and when the same is rotated the action of the flat faces of the cam in forcing the rollers outwardly will cause the same to lock the shaft and hub together to rotate in unison, and should the rotation of the hub become faster than the shaft, the same will be permitted by the rollers rolling backwardly on the flat faces 6 to over-run the shaft.

The roller retainer is capable of free movement relative to the hub and is also capable of free movement relative to the cam disk until such time as the disk is moved independently thereof and forces the rollers into engagement with the inner face of the hub flange.

By my improved structure, I am enabled without the use of the complicated gear mechanisms to accomplish the same results as accomplished by the differential gears now in use, and by providing one of the structures intermediate each wheel and axle, am enabled to employ a solid driving axle for the wheels which, will, through the coöperating instrumentalities drive the wheels in either direction and which will permit the wheels to over-run the axle in its direction of rotation when necessary.

While I have illustrated the device in the drawing in coöperation with a wheel, it is to be understood that the same is adapted for use between any driving member and a member which at times is likely to over-run the driving member.

Having thus described my invention what I claim as new and desire to protect by Letters Patent is:—

In a device of the class described, a drive shaft and means for rotating the same, a driven member surrounding said drive shaft and free to rotate thereon, said driven member provided with an annular flange overhanging said shaft, a cam carried by said drive shaft and rotatable therewith and positioned within said annular overhanging flange, said cam provided on its peripheral edge with a plurality of flattened faces, a flanged roll supporting disk free on said shaft and lying adjacent one side face of said cam with its flange overlying the peripheral edge of said cam, said disk formed on its flanged edge with a roller receiving seat, a plate rotatably mounted on said shaft adjacent the opposite face of said disk and secured to the flange thereof, a locking roller in each of said seats for engagement with the annular flange of said driven member, a plate detachably secured to said driven member and rotatable therewith for inclosing said roll supporting structure, and a retaining nut secured to said shaft.

In testimony whereof I have signed my name to this specification in the presence of two subscribing witnesses.

HORATIO G. COYKENDALL.

Witnesses:
F. E. COYKENDALL,
J. CAMERON.